United States Patent
Kojima

(10) Patent No.: US 9,716,804 B2
(45) Date of Patent: Jul. 25, 2017

(54) IMAGE FORMING APPARATUS, IMAGE FORMING METHOD, AND NON-TRANSITORY COMPUTER READABLE MEDIUM

(71) Applicant: FUJI XEROX CO., LTD., Tokyo (JP)

(72) Inventor: Takashi Kojima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/001,912

(22) Filed: Jan. 20, 2016

(65) Prior Publication Data
US 2017/0085736 A1    Mar. 23, 2017

(30) Foreign Application Priority Data
Sep. 18, 2015   (JP) ................................ 2015-185681

(51) Int. Cl.
H04N 1/04  (2006.01)
H04N 1/00  (2006.01)
G06K 9/00  (2006.01)

(52) U.S. Cl.
CPC ..... *H04N 1/00962* (2013.01); *G06K 9/00469* (2013.01); *H04N 1/00411* (2013.01); *H04N 1/00442* (2013.01)

(58) Field of Classification Search
CPC .......... H04N 1/00962; H04N 1/00411; H04N 1/00442
USPC ....................... 358/1.15, 1.14, 1.9
See application file for complete search history.

(56) References Cited

U.S. PATENT DOCUMENTS

| | | | |
|---|---|---|---|
| 2010/0333183 A1* | 12/2010 | Yago ................. | G06F 3/1222 726/5 |
| 2011/0102830 A1* | 5/2011 | Naitoh ............... | G06F 3/1204 358/1.15 |

FOREIGN PATENT DOCUMENTS

JP    2010-124237 A    6/2010

* cited by examiner

*Primary Examiner* — Houshang Safaipour
(74) *Attorney, Agent, or Firm* — Oliff PLC

(57) ABSTRACT

An image forming apparatus includes an extracting unit, a verifying unit, and a memory. The extracting unit extracts a form from image formation data related to an image formation instruction. The verifying unit verifies a verification target version of a module to be compatible in a case where a difference between a first image formed by using the module of a predetermined version in accordance with the form extracted by the extracting unit and a second image formed by using the module of the verification target version in accordance with the form extracted by the extracting unit is within a permissible range and verifies the verification target version of the module to be incompatible in a case where the difference between the first image and the second image is not within the permissible range. The memory stores a verification result obtained by the verifying unit.

16 Claims, 10 Drawing Sheets

|  | FORM A | FORM B | FORM C | FORM D |
|---|---|---|---|---|
| JOB A | ○ | ○ |  |  |
| JOB B |  | ○ | ○ |  |
| JOB C | ○ |  | ○ | ○ |
| ... | ... | ... | ... | ... |

|  | FORM A | FORM B | FORM C | FORM D | FORM E | ... |
|---|---|---|---|---|---|---|
| VERSION 1 | 1 | 1 | 1 | NOT SUPPORTED | 1 | ... |
| VERSION 2 | 1 | 2 | 2 | 2 | 1 | ... |
| VERSION 3 | 1 |  |  | 2 | 3 | ... |
| VERSION 4 | 4 | 2 |  | 4 | 4 | ... |
| VERSION 5 |  |  |  |  |  | ... |
| ... | ... | ... | ... | ... | ... | ... |

TEXT 3 TEXT 3 — 54F

|  | FORM A | FORM B | FORM C | FORM D | FORM E | ... |
|---|---|---|---|---|---|---|
| VERSION 1 | 1 | 1 | 1 | NOT SUPPORTED | 1 | ... |
| VERSION 2 | 1 | 2 | 2 | 2 | 1 | ... |
| VERSION 3 | 1 |  |  | 2 | 3 | ... |
| VERSION 4 | 4 | 2 |  | 4 | 4 | ... |
| VERSION 5 | 5 | 2 | 5 | 4 | 5 | ... |
| ... | ... | ... | ... | ... | ... | ... |

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-185681 filed Sep. 18, 2015.

BACKGROUND

Technical Field

The present invention relates to an image forming apparatus, an image forming method, and a non-transitory computer readable medium.

SUMMARY

According to an aspect of the invention, there is provided an image forming apparatus including an extracting unit, a verifying unit, and a memory. The extracting unit extracts a form from image formation data related to an image formation instruction. The verifying unit verifies a verification target version of a module to be compatible in a case where a difference between a first image formed by using the module of a predetermined version in accordance with the form extracted by the extracting unit and a second image formed by using the module of the verification target version in accordance with the form extracted by the extracting unit is within a permissible range and verifies the verification target version of the module to be incompatible in a case where the difference between the first image and the second image is not within the permissible range. The memory stores a verification result obtained by the verifying unit.

BRIEF DESCRIPTION OF THE DRAWINGS

Exemplary embodiment of the present invention will be described in detail based on the following figures, wherein:

FIG. 5 illustrates an example of job-form information according to the first exemplary embodiment;

FIG. 6 illustrates an example of version management information according to the first exemplary embodiment;

DETAILED DESCRIPTION

Exemplary embodiments of the present invention will be described in detail below with reference to the accompanying drawings.

First Exemplary Embodiment

An image forming apparatus according to a first exemplary embodiment will be described first.

The image forming apparatus according to the first exemplary embodiment extracts a form from image formation data related to an image formation instruction. The image forming apparatus also determines that a verification target version of a module is compatible if a difference between an image formed by using the module of a predetermined version in accordance with the extracted form and an image formed by using the module of the verification target version in accordance with the extracted form is within a permissible range. The image forming apparatus also determines that the verification target version of the module is incompatible if the difference between the image formed by using the module of the predetermined version in accordance with the extracted from and the image formed by using the module of the verification target version in accordance with the extracted form is not within the permissible range.

The image forming apparatus also stores a verification result that indicates that the verification target version of the module is compatible or incompatible. The image forming apparatus upgrades the module to the verification target version if the image forming apparatus verifies that the verification target version of the module is compatible.

Figure 1:
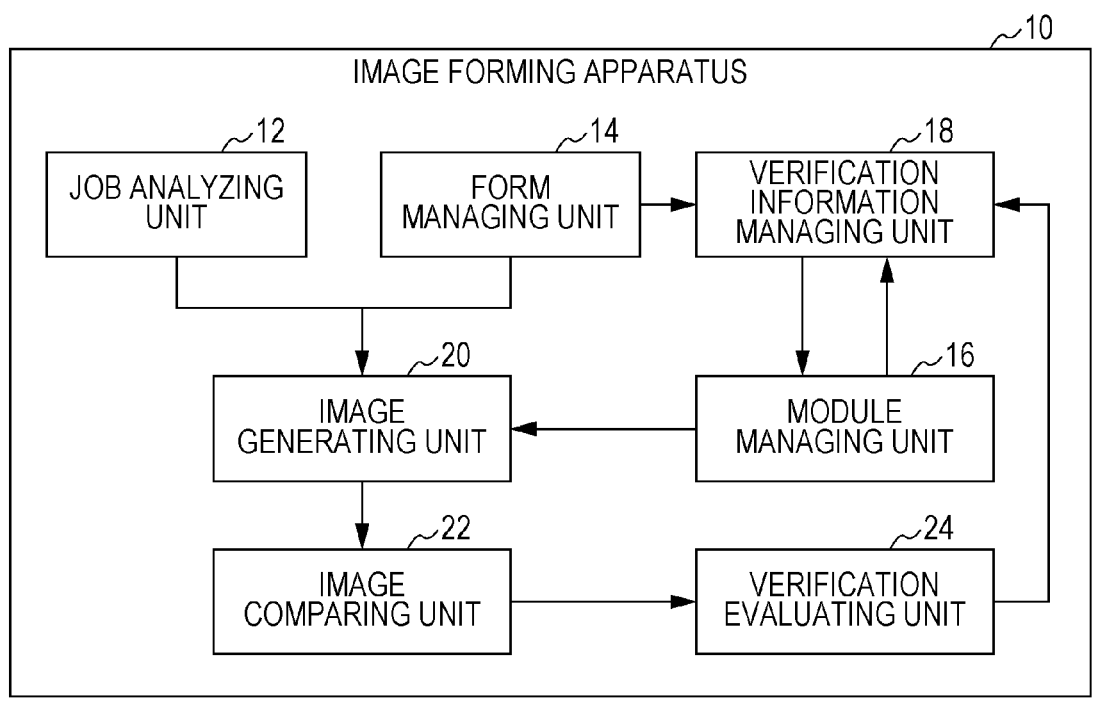
FIG. 1 is a block diagram illustrating functional units of an image forming apparatus according to a first exemplary embodiment.

Referring first to FIG. 1, functional units of an image forming apparatus 10 according to the first exemplary embodiment will be described. As illustrated in FIG. 1, the image forming apparatus 10 includes a job analyzing unit 12, a form managing unit 14, a module managing unit 16, a verification information managing unit 18, an image generating unit 20, an image comparing unit 22, and a verification evaluating unit 24.

The term "module" used in the first exemplary embodiment refers to software that performs a series of processing steps of an image forming process. In addition, the term "image formation data" used in the first exemplary embodiment refers to image formation data including control data for controlling image formation and condition data denoting image forming conditions and corresponds to a so-called image formation job (hereinafter, also simply referred to as a "job"). Also, the term "form" used in the first exemplary embodiment refers to control data that is included in the image formation data, in particular, control data that defines a layout in an image that is formed based on the image formation data. A form includes variable data such as text data and image data. For example, a character string based on the text data and an image based on the image data are arranged in accordance with the form in an image that is formed based on the image formation data.

Figure 2A:
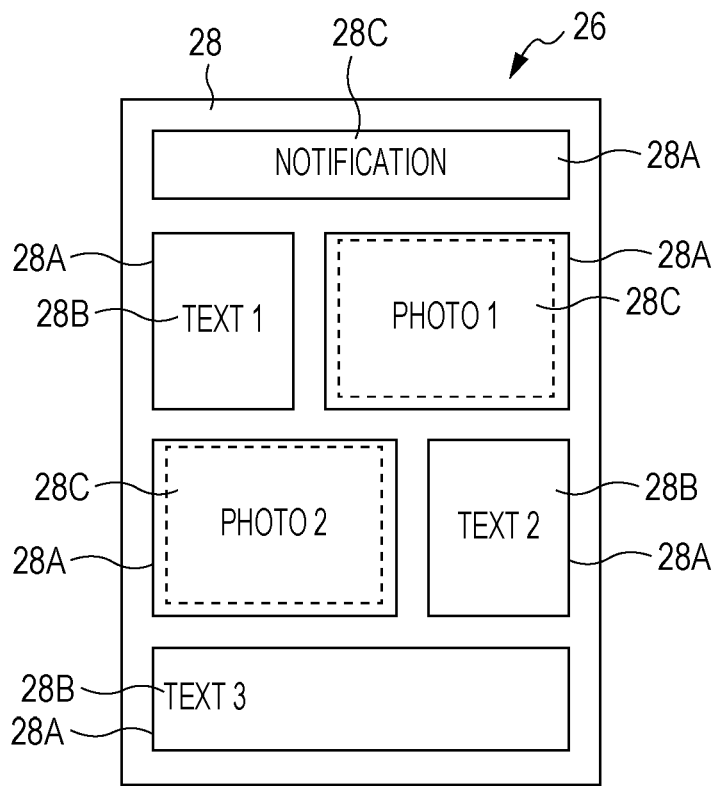
FIG. 2A illustrates an example of a structure of an image based on image formation data according to the first exemplary embodiment.

FIG. 2A illustrates an example of an image 26 based on a job. As illustrated in FIG. 2A, the image 26 based on the job has a layout in which plural parts 28A for displaying, for example, character strings 28B and images 28C are arranged in accordance with a form 28.

Figure 2B:
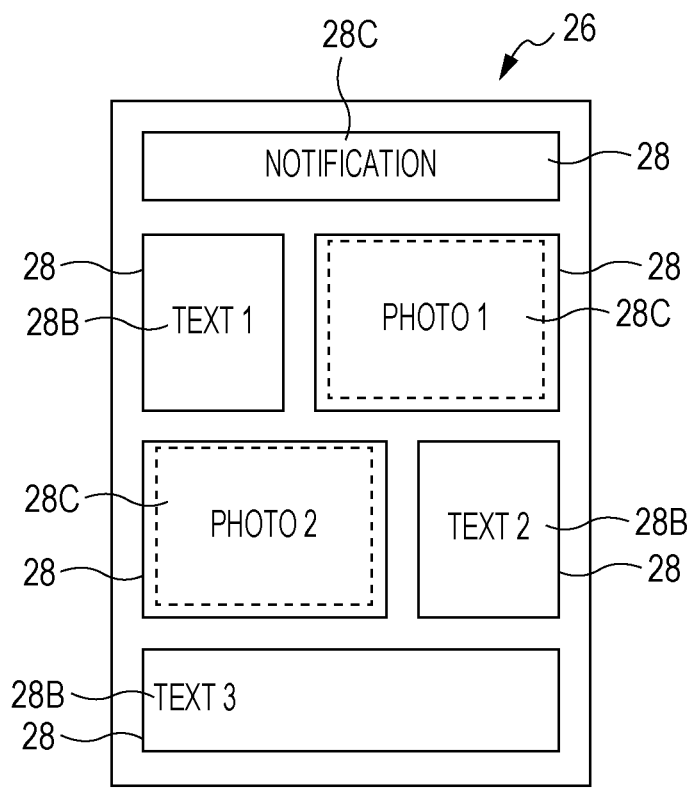
FIG. 2B illustrates an example of a structure of an image based on image formation data according to the first exemplary embodiment.

The case where the plural parts 28A are arranged in accordance with the single form 28 in the image 26 based on the job will be described in the first exemplary embodiment; however, the configuration is not limited to this case. FIG. 2B illustrates another example of the image 26 based on the job. As illustrated in FIG. 2B, the job may include the plural forms 28, and, for example, the character strings 28B and the images 28C may be arranged in accordance with the corresponding forms 28 in the image 26 based on the job.

In the first exemplary embodiment, for each of the forms 28, the compatibility of a verification target version of a module is verified in terms of a layout, such as a position at which, a size in which, and a font with which the character strings 28B and the images 28C included in the form 28 are depicted in the image 26 based on the job.

The job analyzing unit 12, which is an example of an extracting unit, extracts a form included in a job when an image formation instruction is given. The job analyzing unit 12 also sends, to the image generating unit 20, the extracted form as a form used in image formation.

The form managing unit 14 manages plural forms used in image formation. Examples of forms managed by the form managing unit 14 include forms that are defined in advance by an image creating tool or the like, forms that have been extracted from jobs for which image formation has been performed in the past, and forms input by a user operation.

The module managing unit 16 selects a version of a module used in image formation when the image formation instruction is given. The module managing unit 16 also selects a verification target version of the module when verification of the compatibility of the verification target version of the module is performed. In addition, the module managing unit 16 selects a version of the module that has been verified to be compatible, as the predetermined version of the module used as a comparison target, when verification of the compatibility of the verification target version of the module is performed.

The verification information managing unit 18, which is an example of a memory, stores for each version of the module, a verification result regarding the compatibility with each form by storing the compatibility verification result in version management information (described later).

The image generating unit 20 generates an image to be formed on a recording medium during image formation. The image generating unit 20 also sends the generated image to an image forming unit 42 (see FIG. 3) to cause the image forming unit 42 to form the image on a recording medium. The image generating unit 20 generates an image by using a module of a predetermined version and generates an image by using the module of a verification target version when verification of the compatibility of the verification target version of the module is performed.

The image comparing unit 22, which is a verifying unit, obtains from the image generating unit 20 the image generated by using the module of the predetermined version in accordance with a form included in a job when verification of the compatibility of the verification target version of the module is performed. The image comparing unit 22 also obtains, from the image generating unit 20, the image generated by using the module of the verification target version in accordance with the form included in the job when verification of the compatibility of the verification target version of the module is performed. The image comparing unit 22 then generates a differential image of the image generated by using the module of the predetermined version and the image generated by using the module of the verification target version.

The verification evaluating unit 24, which is an example of a verifying unit, an upgrading unit, and a display controller, evaluates whether a difference is within a permissible range by using the differential image generated by the image comparing unit 22. At that time, the verification evaluating unit 24 determines that the version for which the difference is evaluated to be within the permissible range is compatible and determines that the version for which the difference is evaluated not to be within the permissible range is incompatible. The verification evaluating unit 24 then sends the verification result to the verification information managing unit 18. The verification information managing unit 18 stores the received verification result by adding the verification result to the version management information (described later).

Figure 3:
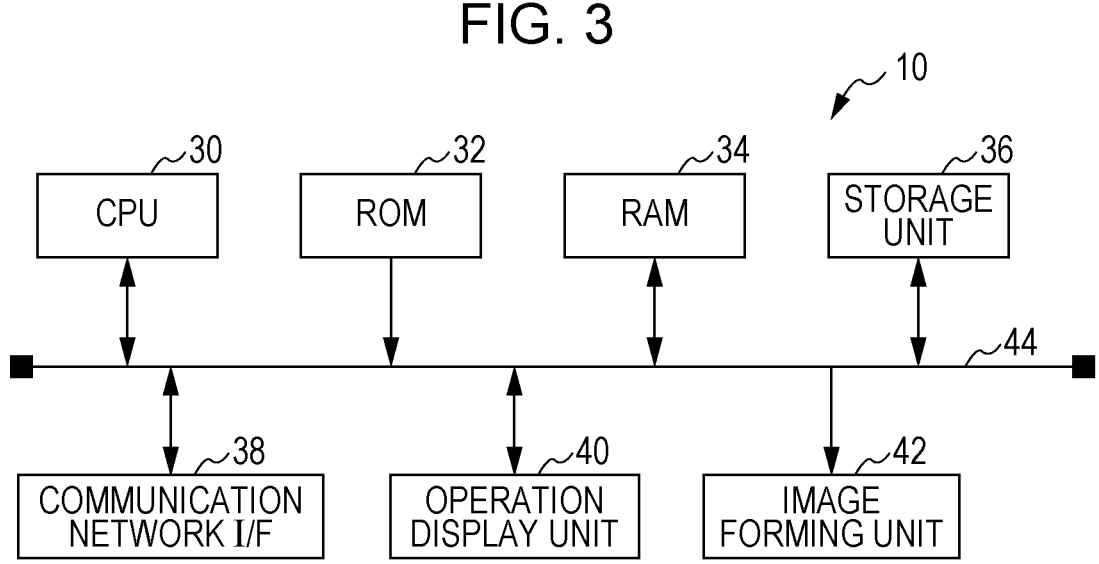
FIG. 3 is a block diagram illustrating a configuration of major electrical components of the image forming apparatus according to the first exemplary embodiment.

As illustrated in FIG. 3, the image forming apparatus 10 according to the first exemplary embodiment is implemented as a result of control performed by a central processing unit (CPU) 30 that manages operations of the image forming apparatus 10. Specifically, the image forming apparatus 10 includes the CPU 30, a read only memory (ROM) 32 that previously stores various programs and various parameters, a random access memory (RAM) 34 that is used as a working space when the CPU 30 executes the various programs, and a storage unit 36 including a nonvolatile memory such as a flash memory. The image forming apparatus 10 also includes a communication network interface (I/F) 38 that implements transmission and reception of communication information to and from an external apparatus. The image forming apparatus 10 also includes an operation display unit 40 that accepts an instruction given to the image forming apparatus 10 from the user and informs the user of various kinds of information regarding the operating state of the image forming apparatus 10 or the like. Note that the operation display unit 40 includes, for example, a touch-panel display that displays various kinds of information and buttons that accept an operation instruction as a result of execution of a program, and hardware buttons such as numeral buttons and a start button.

The image forming apparatus 10 also includes the image forming unit 42 that forms an image on a recording medium. The image forming unit 42 includes various components that perform various kinds of processing included in a process of forming an image on a recording medium.

The CPU 30, the ROM 32, the RAM 34, the storage unit 36, the communication network I/F 38, the operation display unit 40, and the image forming unit 42 are connected to one another via a bus 44, such as an address bus, a data bus, or a control bus.

As described above, in the image forming apparatus 10 according to the first exemplary embodiment, the CPU 30 accesses the ROM 32, the RAM 34, and the storage unit 36 and transmits and receives communication information via the communication network I/F 38. In addition, in the image forming apparatus 10, the CPU 30 obtains various kinds of information via the operation display unit 40 and displays various kinds of information on the operation display unit 40. Further, in the image forming apparatus 10, the CPU 30 causes the image forming unit 42 to form an image.

Figure 4:
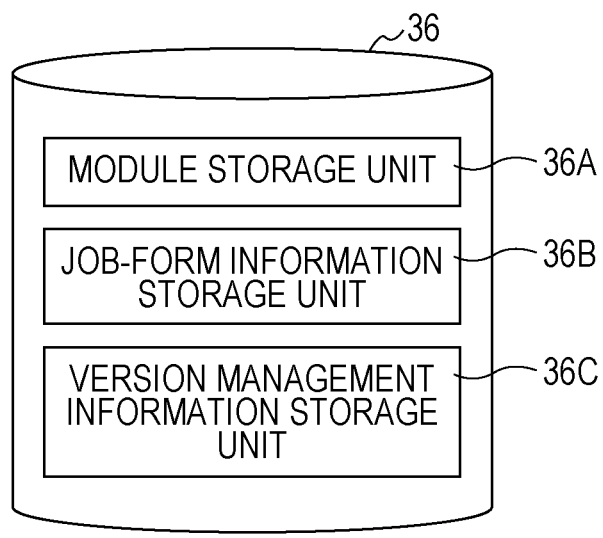
FIG. 4 illustrates an example of a configuration of a storage unit according to the first exemplary embodiment.

As illustrated in FIG. 4, the storage unit 36 includes a module storage unit 36A, a job-form information storage unit 36B, and a version management information storage unit 36C.

The module storage unit 36A stores multiple versions of modules. The stored modules may be modules of all versions used in image formation in the past or modules of one or more latest versions.

The job-form information storage unit 36B stores job-form information that denotes a correspondence between a job and a form. The job-form information is information indicating, for each job, whether the job includes each of forms as illustrated in FIG. 5, for example. In the example illustrated in FIG. 5, a job A includes a form A and a form B, and a job B includes the form B and a form C.

The use of the job-form information allows a module of a version that has already been verified to be compatible with one or more forms included in the job to be efficiently selected as a compatible version of the module without being subjected to further verification. In the example illustrated in FIG. 5, it is assumed that there is a version of the module that is verified to be compatible with the job A including the form A and the form B and a job C including the form A, the form C, and a form D. In such a case, the version of the module is considered to be compatible with the job B including the form B and the form C. Accordingly, verification of the compatibility of the version of the module with the job B may be omitted.

As illustrated in FIG. 6, the version management information storage unit 36C stores, for each version of a module, version management information that denotes the latest version that is verified to be compatible with each form, as the verification result indicating whether the version is compatible with each form. For example, in the case where version 4 of a module is verified to be compatible with a form, "4" is stored in a corresponding field that stores the verification result of version 4. In the example illustrated in FIG. 6, since version 4 of the module is verified to be compatible with the form A, the form D, and a form E, "4" is stored in the corresponding fields. In addition, since version 4 of the module is verified to be incompatible with the form B, "2", which denotes the version that has already been verified to be compatible, is stored in the corresponding field. In addition, since verification of the compatibility of version 4 of the module is yet to be performed for the form C, the corresponding field is left blank.

The version management information allows a version of a module that has been verified to be compatible with all forms included in a job, to be determined as a compatible version of the module when image formation is performed. The example illustrated in FIG. 6 indicates that versions 1 and 2 of the module are verified to be compatible with a job including the form A and the form B. In addition, the example illustrated in FIG. 6 indicates that versions 1 to 4 of the module are verified to be compatible with a job including the form D and the form E.

In the first exemplary embodiment, a correspondence between a version of a module and a form is stored by using a table, just like the version management information described above; however, the configuration is not limited to this one. Any expression, such as a mathematical expression in the set theory, may be used to denote a correspondence between a version of a module and a form.

Figure 7:
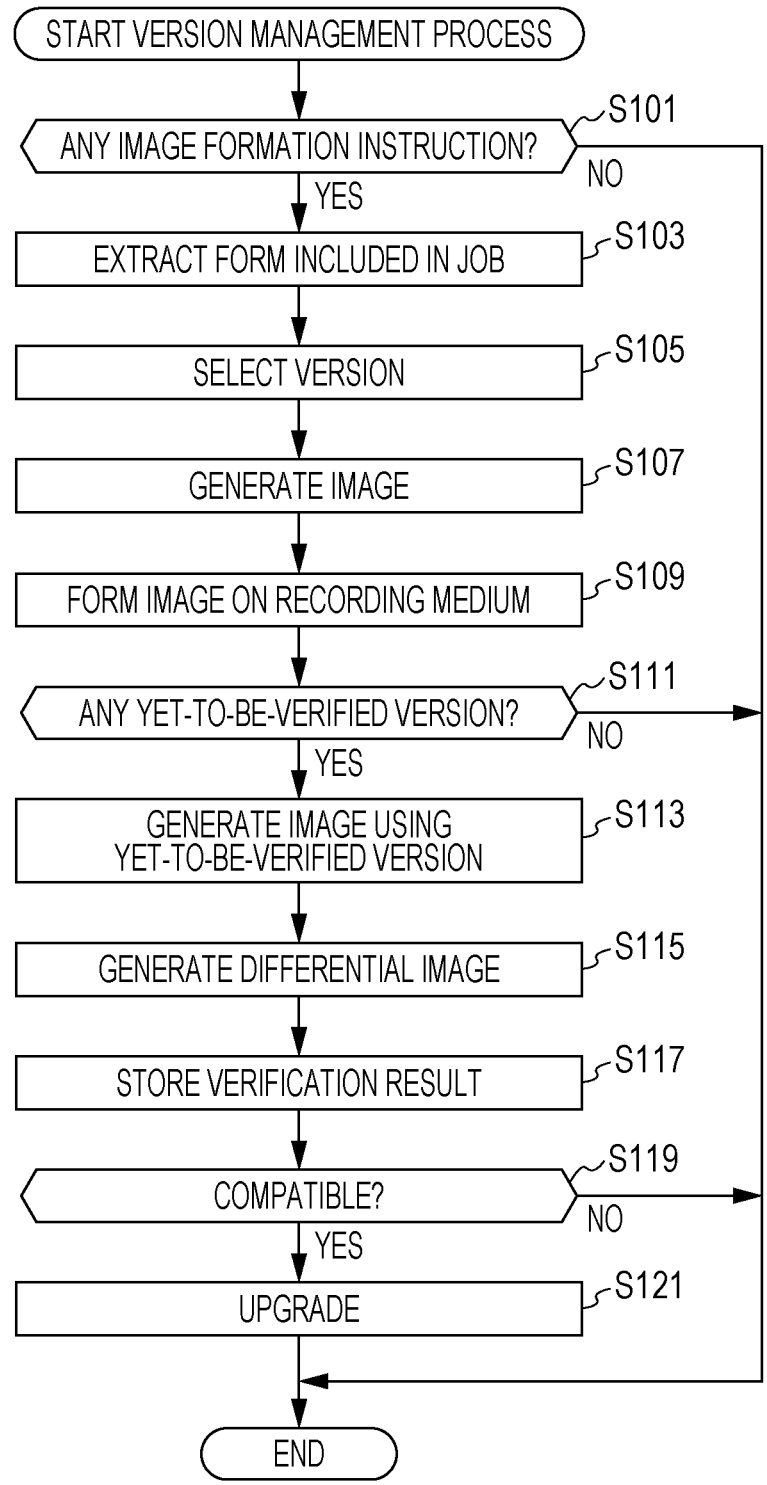
FIG. 7 is a flowchart illustrating a flow of a program implementing a version management process according to the first exemplary embodiment.

Referring next to a flowchart of FIG. 7, a description will be given of a flow of a version management process that is performed by the image forming apparatus 10 according to the first exemplary embodiment every time a predetermined interval passes. In the first exemplary embodiment, a program implementing the version management process is stored in advance in the storage unit 36; however, the configuration is not limited to this one. For example, the program implementing the version management process may be received from an external apparatus via the communication network I/F 38 and stored in the storage unit 36. Alternatively, the program implementing the version management process stored on a recording medium, such as a Compact Disc-Read Only Memory (CD-ROM), may be read by a CD-ROM drive or the like, whereby the version management process may be performed.

In step S101, the job analyzing unit 12 determines whether an image formation instruction is given. The image formation instruction is an ordinary image formation instruction that is given independently of verification of the compatibility of a verification target version of a module. If it is determined in step S101 that an image formation instruction is given (YES in S101), the process proceeds to step S103. If it is determined in step S101 that no image formation instruction is given (NO in S101), the image forming apparatus 10 ends execution of the program implementing the version management process.

In step S103, the job analyzing unit 12 obtains a job for which the image formation instruction is given and extracts one or more forms included in the obtained job.

In step S105, the module managing unit 16 selects a version of the module used for image formation in accordance with the one or more forms included in the job for which the image formation instruction is given. In the first exemplary embodiment, the latest version is selected from among versions that are verified to be compatible with all the forms included in the job for which the image formation instruction is given. Note that the method for selecting the version of the module is not limited to this one. For example, a list of versions of the module may be displayed on the operation display unit 40, and the module managing unit 16 may select a version of the module selected by the user.

Figure 8A:
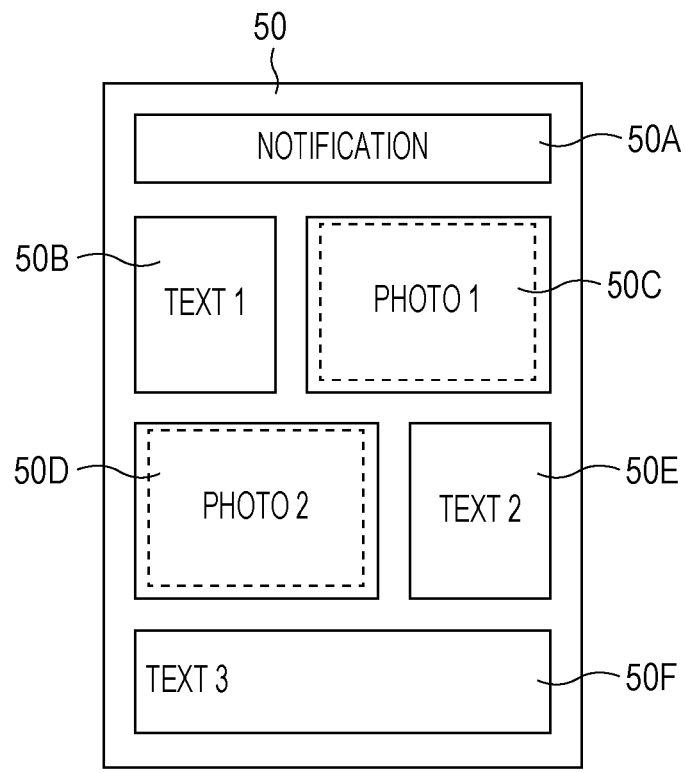
FIG. 8A illustrates an example of an image formed by using a module of a predetermined version in accordance with the first exemplary embodiment.

In step S107, the image generating unit 20 generates an image for which the image formation instruction is given, by using the module of the selected version. FIG. 8A illustrates an example of the image that is formed by using the module of the selected version.

In step S109, the image generating unit 20 outputs the generated image to the image forming unit 42 and causes the image forming unit 42 to form the image on a recording medium. In this way, the instructed image formation is completed. A subsequent process is a process of performing verification of the compatibility of the verification target version of the module, which is performed in background without drawing the user's attention.

In step S111, the image generating unit 20 determines whether there is a version of the module for which the compatibility with any of the forms included in the job of the image formation instruction is yet to be verified. At that time, the image generating unit 20 sends an inquiry to the module managing unit 16 about whether three is a version of the module for which verification of the compatibility with any of the forms included in the job of the image formation instruction is yet to be performed. The module managing unit 16 determines, based on the version management information, whether there is a version for which a field for any of the forms included in the job of the image formation instruction is left blank. If there is a version of the module for which verification is yet to be performed, the module managing unit 16 notifies the image generating unit 20 of the yet-to-be-verified version of the module.

If it is determined in step S111 that there is a yet-to-be-verified version of the module (YES in S111), the process proceeds to step S113. If it is determined in step S111 that there is no yet-to-be-verified version of the module (NO in S111), the image forming apparatus 10 ends execution of the program implementing the version management process. Note that in the case where it is determined that there is no yet-to-be-verified version of the module, the instructed image formation alone is performed and verification of the compatibility of the verification target version of the module is not performed.

Figure 8B:
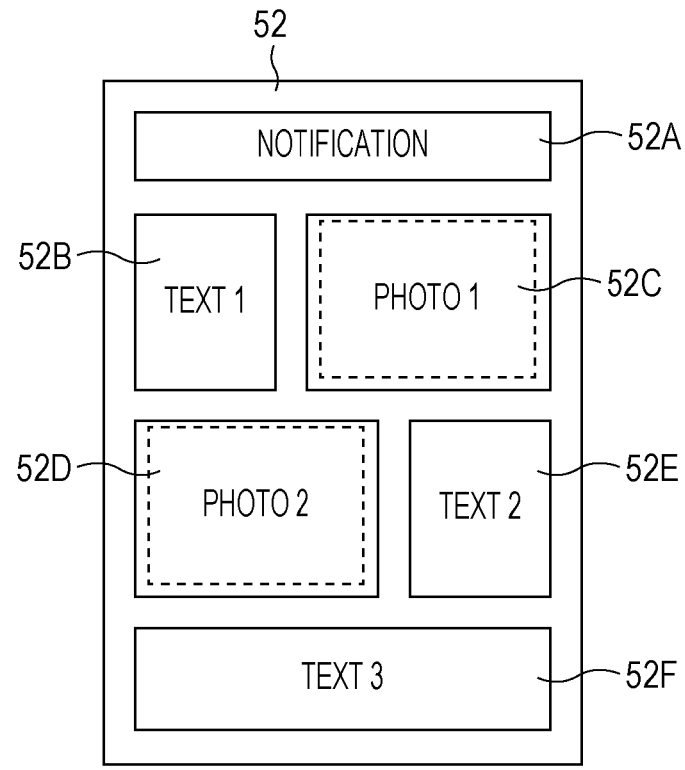
FIG. 8B illustrates an example of an image formed by using a module of a verification target version in accordance with the first exemplary embodiment.

In step S113, the image generating unit 20 generates an image by using the module of the yet-to-be-verified version as the module of the verification target version. At that time, the image generating unit 20 obtains the module of the notified version from the module storage unit 36A, and generates an image for which the image formation instruction is given. FIG. 8B illustrates an example of the image that is formed by using the module of the yet-to-be-verified version.

Figures 9, 10:
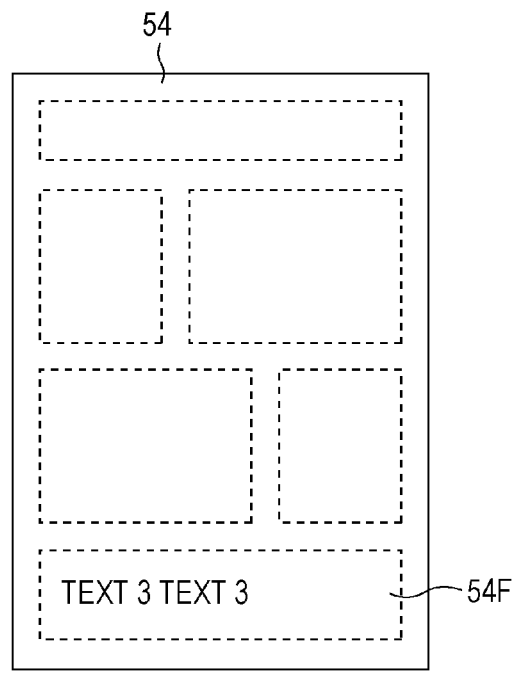
FIG. 9 illustrates an example of a differential image of the image formed by using the module of the predetermined version and the image formed by using the module of the verification target version in accordance with the first exemplary embodiment.
FIG. 10 illustrates an example of updated version management information according to the first exemplary embodiment.

In step S115, the image comparing unit 22 generates a differential image of the image generated in step S107 and the image generated in step S113. For example, as illustrated in FIG. 9, there is no difference between parts 50A to 50E in the image generated in step S107 and parts 52A to 52E in the image generated in step S113, respectively. However, because the position of a character string "TEXT 3" differs between a part 50F in the image generated in step S107 and a part 52F in the image generated in step S113, a difference is caused in a part 54F.

In step S117, the verification evaluating unit 24 verifies whether the difference denoted by the differential image is within a permissible range and stores the verification result. If the difference denoted by the differential image is determined to be within the permissible range, the verification evaluating unit 24 verifies that the version is compatible. If the difference denoted by the differential image is determined not to be within the permissible range, the verification evaluating unit 24 verifies that the version is incompatible. Then, the verification evaluating unit 24 sends the verification result to the verification information managing unit 18. The verification information managing unit 18 stores the received verification result by adding the verification result to the version management information. In the first exemplary embodiment, an area where a difference is caused between a first image formed by using a module of a version that has been verified to be compatible and a second image formed by using the module of a yet-to-be-verified version is extracted. If the largest value of the lengths of vectors denoting displacement between the first image and the second image in the extracted area is smaller than or equal to a predetermined threshold, it is determined that the difference is within the permissible range; however, the method used to determine whether the difference is within the permissible range is not limited to this one. For example, it may be determined that the difference is within the permissible range if an average of lengths of the displacement vectors is smaller than or equal to a predetermined threshold. Alternatively, it may be determined that the difference is within the permissible range if the number of pixels for which the difference is caused in the differential image is smaller than or equal to a threshold.

In step S119, the verification evaluating unit 24 determines whether the yet-to-be-verified version of the module is compatible with the version of the module selected in step S105. In the first exemplary embodiment, for example as illustrated in FIG. 10, it is determined that the yet-to-be-verified version is compatible with the selected version if the yet-to-be verified version is verified to be compatible with the predetermined forms A, C, and E, for example. Specifically, in the example illustrated in FIG. 10, since version 5 of the module is verified to be compatible with the forms A, C, and E, version 5 of the module is determined to be compatible. In contrast, if version 5 of the module is verified to be incompatible with one or more forms among the forms A, C, and E, it is determined that version 5 of the module is incompatible. Note that the method used to determine whether the version is compatible is not limited to this one. For example, it may be determined that each version of the module is compatible if the version of the module is verified to be compatible with all forms. Alternatively, it may be determined that each version of the module is compatible if the version is verified to be compatible with one or more forms that are used with a frequency higher than or equal to a predetermined threshold.

In step S121, the module is upgraded to the verification target version. Note that in response to an image formation instruction, an image may be formed by using the module of the upgraded version or the version selected with the selection method described in step S105.

As described above, in the first exemplary embodiment, one or more forms are extracted from an image formation job when an image is formed. In addition, it is determined whether a difference between an image formed by using a module of a predetermined version in accordance with the extracted form and an image formed by using the module of the verification target version in accordance with the extracted form is within a permissible range. In addition, the verification result is stored, which indicates that the verification target version is verified to be compatible if the difference is within the permissible range and that the verification target version is verified to be incompatible if the difference is not within the permissible range.

In addition, in the first exemplary embodiment, if the stored verification result indicates that the verification target version is verified to be compatible with a predetermined form, the module is upgraded to the verification target version.

Second Exemplary Embodiment

An image forming apparatus according to a second exemplary embodiment will be described next.

In the first exemplary embodiment, the description has been given of the case where verification as to whether a certain version of the module is compatible is performed when an image formation instruction is given by using a job for which the image formation instruction is given. In contrast, in the second exemplary embodiment, a description will be given of the case where verification as to whether the certain version of the module is compatible is performed by using a dummy job when image formation is not performed.

The image forming apparatus 10 according to the second exemplary embodiment has a configuration that is substantially the same as that of the image forming apparatus 10 according to the first exemplary embodiment except that the image forming apparatus 10 according to the second exemplary embodiment further includes a dummy job generating unit 46. Accordingly, a description of the components other than the dummy job generating unit 46 is omitted.

To verify the compatibility of a certain version of a module, the dummy job generating unit 46 generates a dummy job that includes a form for which the version of the module is yet to be verified. The dummy job generating unit 46 then sends the generated dummy job to the job analyzing unit 12. With this configuration, verification of the compatibility of a yet-to-be-verified version of the module is performed even if no image formation instruction is given or if a job for which an image formation instruction is given does not include a form for which the version of the module is yet to be verified.

To generate a dummy job, jobs for which image formation instructions have been given in the past may be stored. A dummy job may be generated in accordance with these jobs. For example, a character string contained in a form included in a job may be replaced with a given character string, such as a character string of an asterisk (*), and the resulting character string may be stored along with the largest length and the smallest length of the character string. Then, dummy data may be generated in accordance with these pieces of data. As for image data included in a job, a dummy image may be generated in accordance with the size, the format, and the resolution of the image, for example. By dividing an image based on a job into parts included in a form and evaluating the individual parts, verification of the compatibility of the version of the module is efficiently performed by taking a small difference into consideration.

Figure 12:
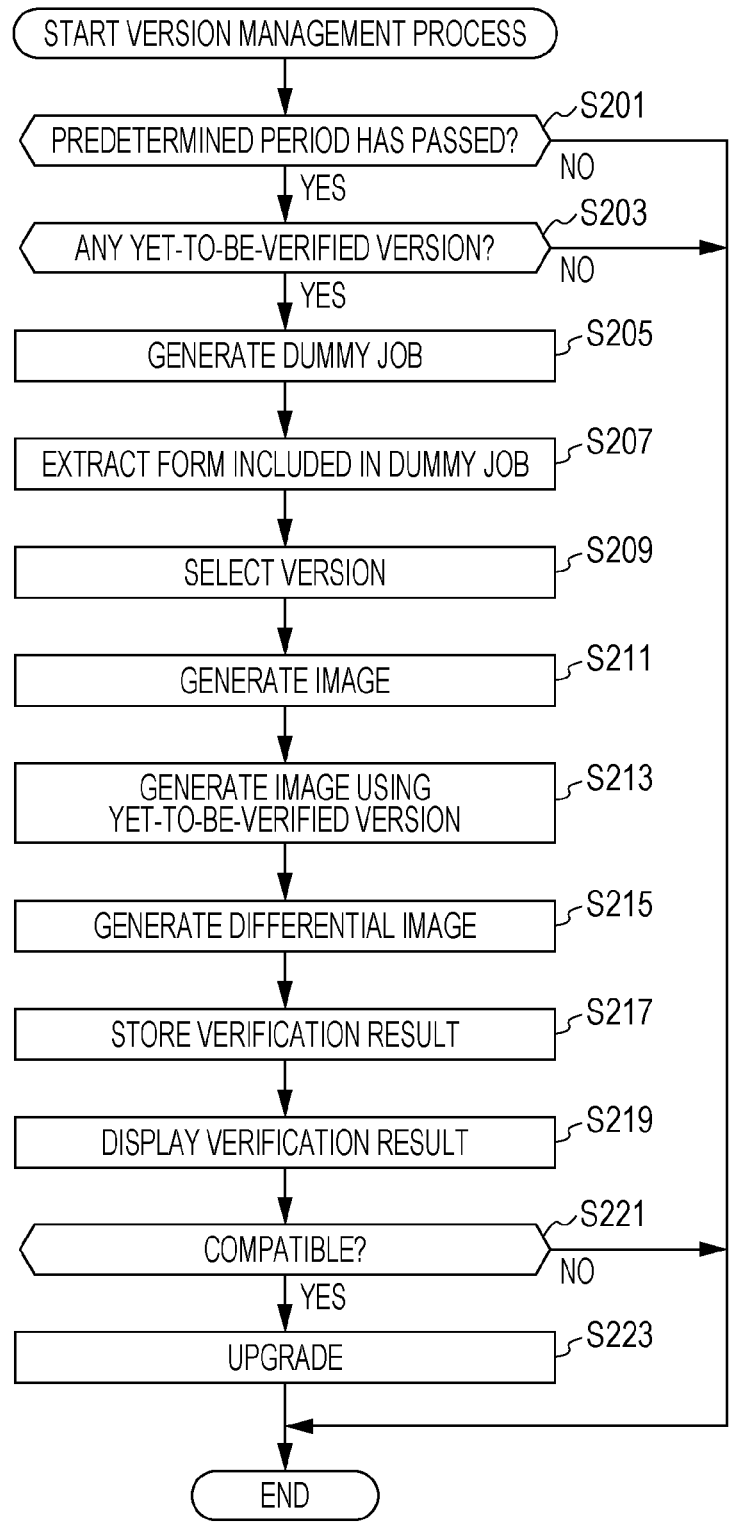
FIG. 12 is a flowchart illustrating a flow of a program implementing a version management process according to the second exemplary embodiment.

Referring next to a flowchart of FIG. 12, a description will be given of a flow of a version management process performed by the image forming apparatus 10 according to the second exemplary embodiment every time a predetermined period passes. In the second exemplary embodiment, a program implementing the version management process is stored in advance in the storage unit 36; however, the configuration is not limited to this one. For example, the program implementing the version management process may be received from an external apparatus via the communication network I/F 38 and stored in the storage unit 36.

Alternatively, the program implementing the version management process stored on a recording medium, such as a CD-ROM, may be read by a CD-ROM drive or the like, whereby the version management process may be performed.

In step S201, the dummy job generating unit 46 determines whether a predetermined period (e.g., 5 minutes) has passed from the last version management process. If it is determined in step S201 that the predetermined period has passed (YES in S201), the process proceeds to step S203. If it is determined in step S201 that the predetermined period has not passed (NO in S201), the image forming apparatus 10 ends execution of the program implementing the version management process.

In step S203, the image generating unit 20 determines whether there is a version of the module for which verification of the compatibility with any of the forms included in the job related to the image formation instruction is yet to be performed, as in step S111. If it is determined in step S203 that there is a version of the module for which verification is yet to be performed (YES in S203), the process proceeds to step S205. If it is determined in step S203 that there is no version of the module for which verification is yet to be performed (NO in S203), the image forming apparatus 10 ends execution of the program implementing the version management process.

In step S205, the dummy job generating unit 46 generates a dummy job.

In step S207, the job analyzing unit 12 extracts a form included in the dummy job.

In step S209, the module managing unit 16 selects a version of the module in accordance with the form included in the dummy job. In the second exemplary embodiment, the latest version is selected from among versions that are verified to be compatible with the form included in the dummy job.

In step S211, the image generating unit 20 generates an image based on the dummy job by using the module of the selected version.

In step S213, the image generating unit 20 generates an image based on the dummy job by using the module of the yet-to-be-verified version. At that time, the image generating unit 20 obtains the module of the notified version from the module storage unit 36A and generates an image based on the dummy job. FIG. 8B illustrates an example of the image that is formed by using the module of the yet-to-be-verified version.

In step S215, the image comparing unit 22 generates a differential image of the image generated in step S211 and the image generated in step S213, as in step S115.

In step S217, the verification evaluating unit 24 verifies whether a difference denoted by the differential image is within a permissible range and stores the verification result, as in step S117.

In step S219, the verification evaluating unit 24 causes the operation display unit 40 to display the verification result and information prompting a user to input an upgrade instruction for upgrading the module to the verification target version.

Figure 13:
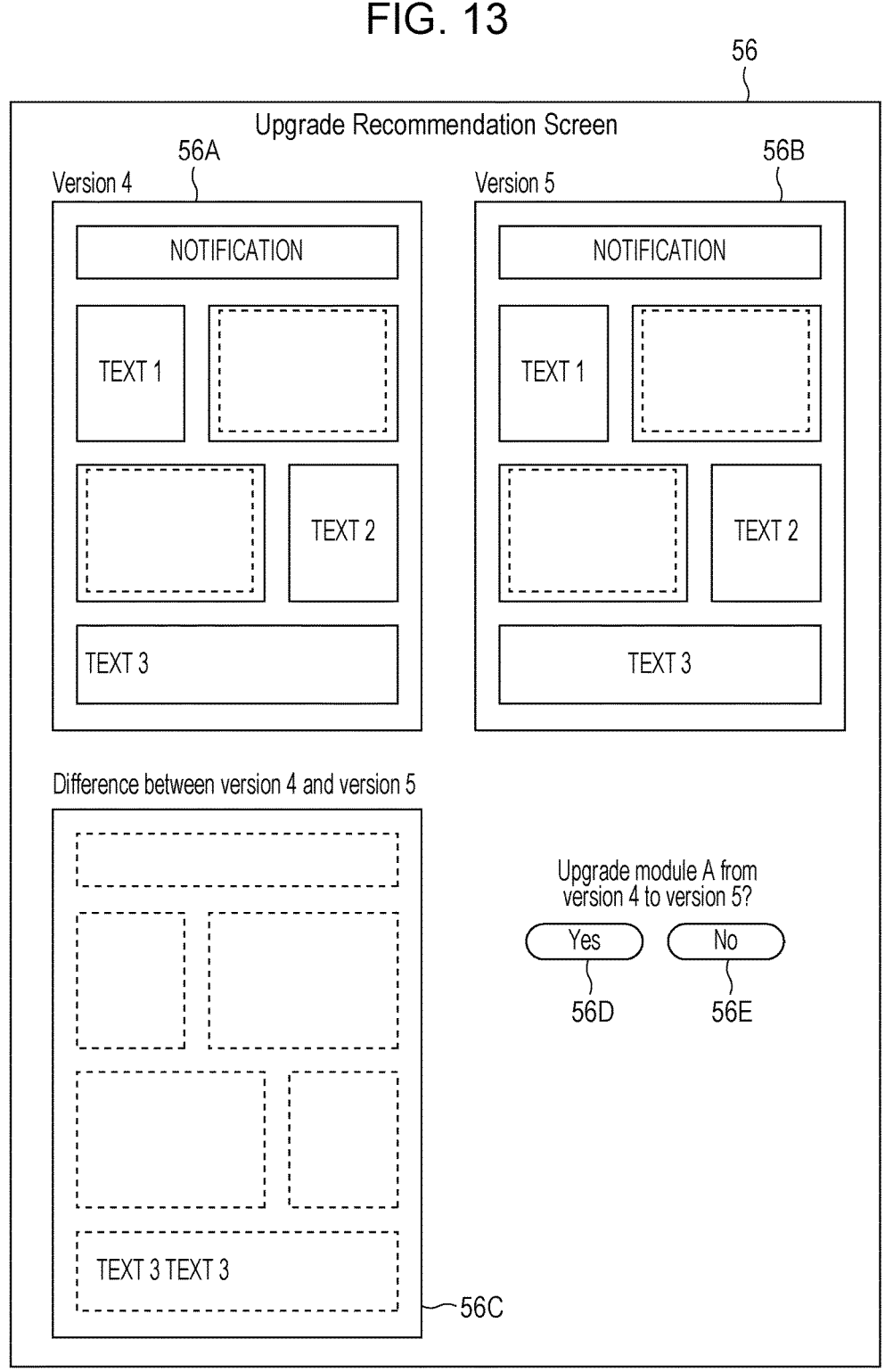
FIG. 13 illustrates an example of an upgrade recommendation screen according to the second exemplary embodiment.

In the second exemplary embodiment, the verification evaluating unit 24 causes the operation display unit 40 to display, for example, an upgrade recommendation screen 56 illustrated in FIG. 13. The upgrade recommendation screen 56 includes an image 56A formed by using the module of the selected version (version 4), an image 56B formed by using the yet-to-be-verified version (version 5), and a differential image 56C of the images 56A and 56B. The upgrade recommendation screen 56 also includes a "Yes" button 56D for inputting an instruction for upgrading and a "No" button 56E for inputting an instruction for not upgrading. The user checks the images 56A and 56B and the differential image 56C. If the user determines that the yet-to-be-verified version is compatible, the user selects the "Yes" button 56D by operating the operation display unit 40. If the user determines that the yet-to-be-verified version is incompatible, the user selects the "No" button 56E.

In step S221, the verification evaluating unit 24 determines whether the yet-to-be-verified version of the module is compatible with the version of the module selected in step S209. In the second exemplary embodiment, it is determined that the yet-to-be-verified version is compatible with the selected version if the "Yes" button 56D is selected in the upgrade recommendation screen 56. If it is determined in step S221 that the yet-to-be-verified version is compatible with the selected version (YES in S221), the process proceeds to step S223. If it is determined in step S221 that the yet-to-be-verified version is incompatible with the selected version (NO in S221), the image forming apparatus 10 ends execution of the program implementing the version management process.

In step S223, the verification evaluating unit 24 upgrades the module to the verification target version, as in step S121.

As described above, in the second exemplary embodiment, a form is extracted from a job generated for verification. It is determined whether a difference between an image formed by using a module of a predetermined version in accordance with the extracted form and an image formed by using the module of the verification target version in accordance with the extracted form is within a permissible range, when image formation is not performed.

In addition, the verification result and information prompting the user to input an upgrade instruction for upgrading the module to the verification target version are displayed on a display. If the upgrade instruction is input, the module is upgraded to the verification target version.

In addition to the verification result obtained in verification using a differential image, the verification result obtained by presenting the differential image to the user and allowing the user to determine whether the difference is within the permissible range may be added to the version management information.

In addition, the version management information according to the first and second exemplary embodiments denotes, as the verification result indicating whether the version is compatible with each form, the latest version that is verified to be compatible; however, the configuration is not limited to this one. For example, as the version management information, the verification result indicating whether each version of the module is compatible with each form may be used.

Figure 11:
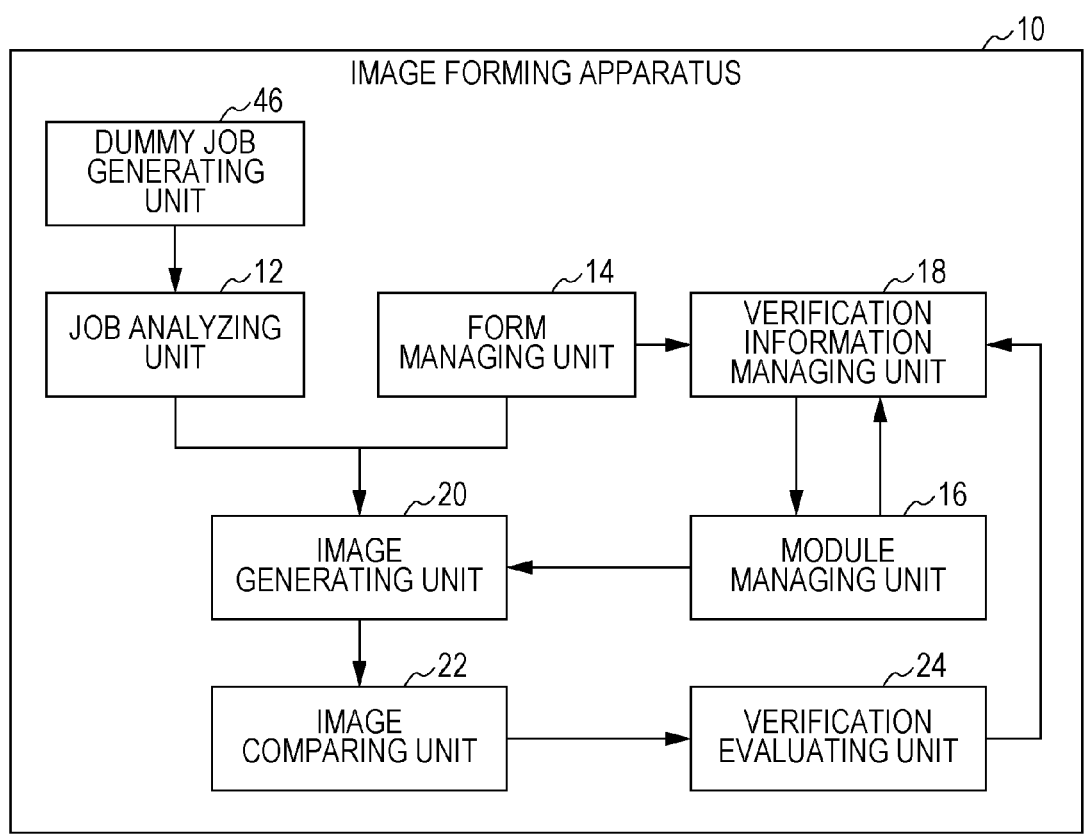
FIG. 11 is a block diagram illustrating functional units of an image forming apparatus according to a second exemplary embodiment.

Note that the configurations (see FIGS. 1, 2, and 11) of the image forming apparatus 10 described in the first and second exemplary embodiments are merely examples. Accordingly, unnecessary part may be omitted or new part may be added within the scope not departing from the gist of the present invention obviously.

In addition, the flows (see FIGS. 7 and 12) of the programs described in the first and second exemplary embodiments are merely examples. Accordingly, an unnecessary step may be omitted, a new step may be added, or processing order may be changed within the scope not departing from the gist of the present invention obviously.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    an extracting unit that extracts a form from image formation data related to an image formation instruction, wherein the form comprises control data that defines a layout of data in an image that is formed based on the image formation data and includes text data and/or image data;
    a verifying unit that verifies a verification target version of a module to be compatible in a case where a difference between a first image formed by using the module of a predetermined version in accordance with the form extracted by the extracting unit and a second image formed by using the module of the verification target version in accordance with the form extracted by the extracting unit is within a permissible range and that verifies the verification target version of the module to be incompatible in a case where the difference between the first image and the second image is not within the permissible range; and
    a memory that stores a verification result obtained by the verifying unit.

2. The image forming apparatus according to claim 1, wherein
    the extracting unit extracts a form from image formation data created for verification, and
    the verifying unit performs the verification when image formation is not performed.

3. The image forming apparatus according to claim 1, further comprising:
    an upgrading unit that upgrades the module to the verification target version in a case where the verifying unit verifies the verification target version of the module to be compatible.

4. The image forming apparatus according to claim 2, further comprising:
    an upgrading unit that upgrades the module to the verification target version in a case where the verifying unit verifies the verification target version of the module to be compatible.

5. The image forming apparatus according to claim 1, wherein
    the image formation data includes a plurality of forms and the module has a plurality of versions,
    the memory stores, for each of the plurality of forms and for each of the plurality of versions, the verification result indicating that the version serving as the verification target version is verified by the verifying unit to be compatible with the form in a case where the difference between the first image and the second image is within the permissible range, or indicating that the version serving as the verification target version is verified by the verifying unit to be incompatible with the form in a case where the difference between the first image and the second image is not within the permissible range, and
    the image forming apparatus further comprises:
    an upgrading unit that upgrades the module to the verification target version among the plurality of versions in a case where the verification result stored in the memory indicates that the verification target version of the module is verified to be compatible with a predetermined form among the plurality of forms.

6. The image forming apparatus according to claim 2, wherein
    the image formation data includes a plurality of forms and the module has a plurality of versions,
    the memory stores, for each of the plurality of forms and for each of the plurality of versions, the verification result indicating that the version serving as the verification target version is verified by the verifying unit to be compatible with the form in a case where the difference between the first image and the second image is within the permissible range, or indicating that the version serving as the verification target version is verified by the verifying unit to be incompatible with the form in a case where the difference between the first image and the second image is not within the permissible range, and the image forming apparatus further comprises:
an upgrading unit that upgrades the module to the verification target version among the plurality of versions in a case where the verification result stored in the memory indicates that the verification target version of the module is verified to be compatible with a predetermined form among the plurality of forms.

7. The image forming apparatus according to claim 3, further comprising:
a display controller that performs control to cause the verification result obtained by the verifying unit and information prompting a user to input an upgrade instruction for upgrading the module to the verification target version to be displayed on a display,
wherein the upgrading unit upgrades the module to the verification target version in response to input of the upgrade instruction.

8. The image forming apparatus according to claim 4, further comprising:
a display controller that performs control to cause the verification result obtained by the verifying unit and information prompting a user to input an upgrade instruction for upgrading the module to the verification target version to be displayed on a display,
wherein the upgrading unit upgrades the module to the verification target version in response to input of the upgrade instruction.

9. The image forming apparatus according to claim 5, further comprising:
a display controller that performs control to cause the verification result obtained by the verifying unit and information prompting a user to input an upgrade instruction for upgrading the module to the verification target version to be displayed on a display,
wherein the upgrading unit upgrades the module to the verification target version in response to input of the upgrade instruction.

10. The image forming apparatus according to claim 6, further comprising:
a display controller that performs control to cause the verification result obtained by the verifying unit and information prompting a user to input an upgrade instruction for upgrading the module to the verification target version to be displayed on a display,
wherein the upgrading unit upgrades the module to the verification target version in response to input of the upgrade instruction.

11. The image forming apparatus according to claim 7, wherein the display controller performs control to cause at least one of a set of the first image and the second image, and a differential image of the first image and the second image to be displayed on the display.

12. The image forming apparatus according to claim 8, wherein the display controller performs control to cause at least one of a set of the first image and the second image, and a differential image of the first image and the second image to be displayed on the display.

13. The image forming apparatus according to claim 9, wherein the display controller performs control to cause at least one of a set of the first image and the second image, and a differential image of the first image and the second image to be displayed on the display.

14. The image forming apparatus according to claim 10, wherein the display controller performs control to cause at least one of a set of the first image and the second image, and a differential image of the first image and the second image to be displayed on the display.

15. An image forming method comprising:
extracting a form from image formation data related to an image formation instruction, wherein the form comprises control data that defines a layout of data in an image that is formed based on the image formation data and includes text data and/or image data;
verifying a verification target version of a module to be compatible in a case where a difference between a first image formed by using the module of a predetermined version in accordance with the form extracted in the extracting and a second image formed by using the module of the verification target version in accordance with the form extracted in the extracting is within a permissible range, and verifying the verification target version of the module to be incompatible in a case where the difference between the first image and the second image is not within the permissible range; and
storing, in a memory, a verification result obtained in the verifying.

16. A non-transitory computer readable medium storing a program causing a computer to execute a process for forming an image, the process comprising:
extracting a form from image formation data related to an image formation instruction, wherein the form comprises control data that defines a layout of data in an image that is formed based on the image formation data and includes text data and/or image data;
verifying a verification target version of a module to be compatible in a case where a difference between a first image formed by using the module of a predetermined version in accordance with the form extracted in the extracting and a second image formed by using the module of the verification target version in accordance with the form extracted in the extracting is within a permissible range, and verifying the verification target version of the module to be incompatible in a case where the difference between the first image and the second image is not within the permissible range; and
storing, in a memory, a verification result obtained in the verifying.

* * * * *